US006996667B2

(12) United States Patent
Aoki et al.

(10) Patent No.: US 6,996,667 B2
(45) Date of Patent: Feb. 7, 2006

(54) METHOD AND APPARATUS FOR REWRITING PROGRAM EXECUTED IN DISK DRIVE

(75) Inventors: Takao Aoki, Hanno (JP); Yasumasa Nakano, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 327 days.

(21) Appl. No.: 10/438,046

(22) Filed: May 15, 2003

(65) Prior Publication Data

US 2004/0022096 A1    Feb. 5, 2004

(30) Foreign Application Priority Data

Jul. 30, 2002  (JP) .............................. 2002-221835

(51) Int. Cl.
    G06F 12/00   (2006.01)
(52) U.S. Cl. ................. 711/112; 711/167; 717/168; 717/174
(58) Field of Classification Search ............... 711/112, 711/103, 1, 2; 369/53.18
    See application file for complete search history.

(56) References Cited

U.S. PATENT DOCUMENTS 5,297,067 A     3/1994  Blackborow et al.
5,521,896 A  *  5/1996  Bajorek et al. .......... 369/53.18

FOREIGN PATENT DOCUMENTS

| EP | 0 621 529 A2 | 10/1994 |
| EP | 0 994 410 A2 | 4/2000 |
| EP | 0994410 A2 * | 4/2000 |
| EP | 1 008 928 A1 | 6/2000 |
| EP | 1008928 A1 * | 6/2000 |
| JP | 6-295238 | 10/1994 |
| JP | 07-121974 | 5/1995 |
| JP | 7-121974 | 5/1995 |
| JP | 8-125830 | 5/1996 |
| JP | 10-307726 * | 5/1997 |
| JP | 10-307726 | 11/1998 |
| JP | 11-237957 | 8/1999 |
| JP | 2000-99270 | 4/2000 |
| JP | 2002-41298 | 2/2002 |

OTHER PUBLICATIONS

Written Opinion and Search Report, dated Feb. 16, 2004, from the Danish Patent and Trademark Office for Patent Application, No. SG 200302564-0.
Japanese Office Action dated Jan. 11, 2005, for Japanese Patent Application No. 2002-221835.

* cited by examiner

Primary Examiner—Reginald G. Bragdon
Assistant Examiner—Craig E Walter
(74) Attorney, Agent, or Firm—Pillsbury Winthrop Shaw Pittman LLP

(57) ABSTRACT

If a disk drive receives a program transfer command issued by a host system, a program specified by the command is written to a disk. Next time the disk drive is powered on, a process is executed during an activating process, the process including using the program written to the disk to rewrite a program stored in a nonvolatile memory.

6 Claims, 7 Drawing Sheets

METHOD AND APPARATUS FOR REWRITING PROGRAM EXECUTED IN DISK DRIVE

CROSS-REFERENCE TO RELATED APPLICATIONS

This application is based upon and claims the benefit of priority from the prior Japanese Patent Application No. 2002-221835, filed Jul. 30, 2002, the entire contents of which are incorporated herein by reference.

BACKGROUND OF THE INVENTION

1. Field of the Invention

The present invention relates to a disk drive comprising a disk medium on which data is recorded, and in particular, to a method and apparatus favorably used to rewrite a program executed in the disk drive.

2. Description of the Related Art

A disk drive comprises a disk medium on which data is recorded. The disk drive is typically connected to a host system that utilizes this drive. The host system is electronic equipment utilizing the disk drive as auxiliary storage (mass storage) and represented by a personal computer. The disk drive executes various processes including recording of data on the disk medium and reading of data from the medium. These processes are implemented by allowing a CPU provided in the disk drive to execute a predetermined program (control program). This program is generally stored in a nonvolatile memory provided in the disk drive.

There has been a growing demand for a disk drive that can rewrite the program stored in the nonvolatile memory. Recent disk drives thus use a rewritable nonvolatile memory to store the program (refer to, for example, Jpn. Pat. Appln. KOKAI Publication No. 2000-99270). Such a nonvolatile memory is, for example, a flash ROM (Read Only Memory).

In general, to rewrite the program stored in the rewritable nonvolatile memory in the disk drive, the host system executes the procedure described below. First, the host system executes a command to transfer a new program to the disk drive. Subsequently, the host system executes a command to write the program transferred to the disk drive to the nonvolatile memory. That is, immediately after transferring the new program to be rewritten to the disk drive, the host system writes the program to the nonvolatile memory. Thus, the program stored in the nonvolatile memory is changed to the new program. In this state, the host system executes a command to reactivate the rewritten program. That is, the host system reactivates the entire system immediately after the program has been rewritten.

To safely rewrite the program stored in the nonvolatile memory in the disk drive, it is necessary to establish the following condition: while the program is being rewritten, the host system accesses the disk drive only for the purpose of rewriting the program. However, if the host system is a personal computer, the computer generally has a multitasking function of concurrently executing a plurality of tasks (programs). It is dangerous to rewrite the program stored in the nonvolatile memory in the disk drive in the environment in which a plurality of tasks are concurrently executed.

In the prior art, the method described below is thus used to reactivate the entire system after the program has been rewritten and to prevent the host system from accessing the disk drive while the program is being rewritten. First, a floppy disk is provided in which a boot program and an application program for rewriting the program are stored. The boot program has the minimum required boot function. The application program is compatible with the architecture of the host system (computer architecture). This floppy disk is installed in a floppy disk drive in the host system. In this state, the host system executes the application program on the floppy disk to rewrite the program stored in the nonvolatile memory in the disk drive according to the above described procedure.

However, in the above described conventional technique, the program rewriting procedure is disadvantageously complicated. Further, the host system, having any of various architectures, must be provided with a program rewriting application program characteristic of the system. In particular, the disk drive has hitherto been used in fields other than personal computers, such as mass storage for a car navigation apparatus and mass storage for an audiovisual (AV) apparatus. That is, the host system utilizing the disk drive is not necessarily a host system computer (host computer). Further, various architectures are applied to the host system. Thus, the above problem is marked.

Furthermore, with the above described conventional technique, the entire system must be reactivated immediately after the program has been rewritten. It is thus difficult to run the program rewriting application program on an ordinary operating system. Accordingly, with the conventional technique, the program rewriting application program is executed using the floppy disk on which the boot program is stored and without relying on the operating system. However, all recent host systems utilizing a disk drive do not have a floppy disk drive. It is therefore difficult to rewrite the program executed on the disk drive utilized by a host system that does not have a floppy disk drive.

BRIEF SUMMARY OF THE INVENTION

According to one embodiment of the present invention, there is provided a program rewriting method of rewriting a program stored in a nonvolatile memory in a disk drive in which control including that of accesses to a disk medium is executed according to the program. This method comprises writing a program specified by a program transfer command for transfer of a program to the disk medium upon receiving the program transfer command from a host system, and executing an activating process to activate the disk drive according to the program stored in the nonvolatile memory when the disk drive is powered on. The executing an activating process includes rewriting the program stored in the nonvolatile memory using the program written in the disk medium according to the program transfer command.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIGS. 4A and 4B are flowcharts illustrating a process procedure executed by that part of a main program 43 in FIG. 2 which executes a reset process upon power-on;

DETAILED DESCRIPTION OF THE INVENTION

Figure 1:
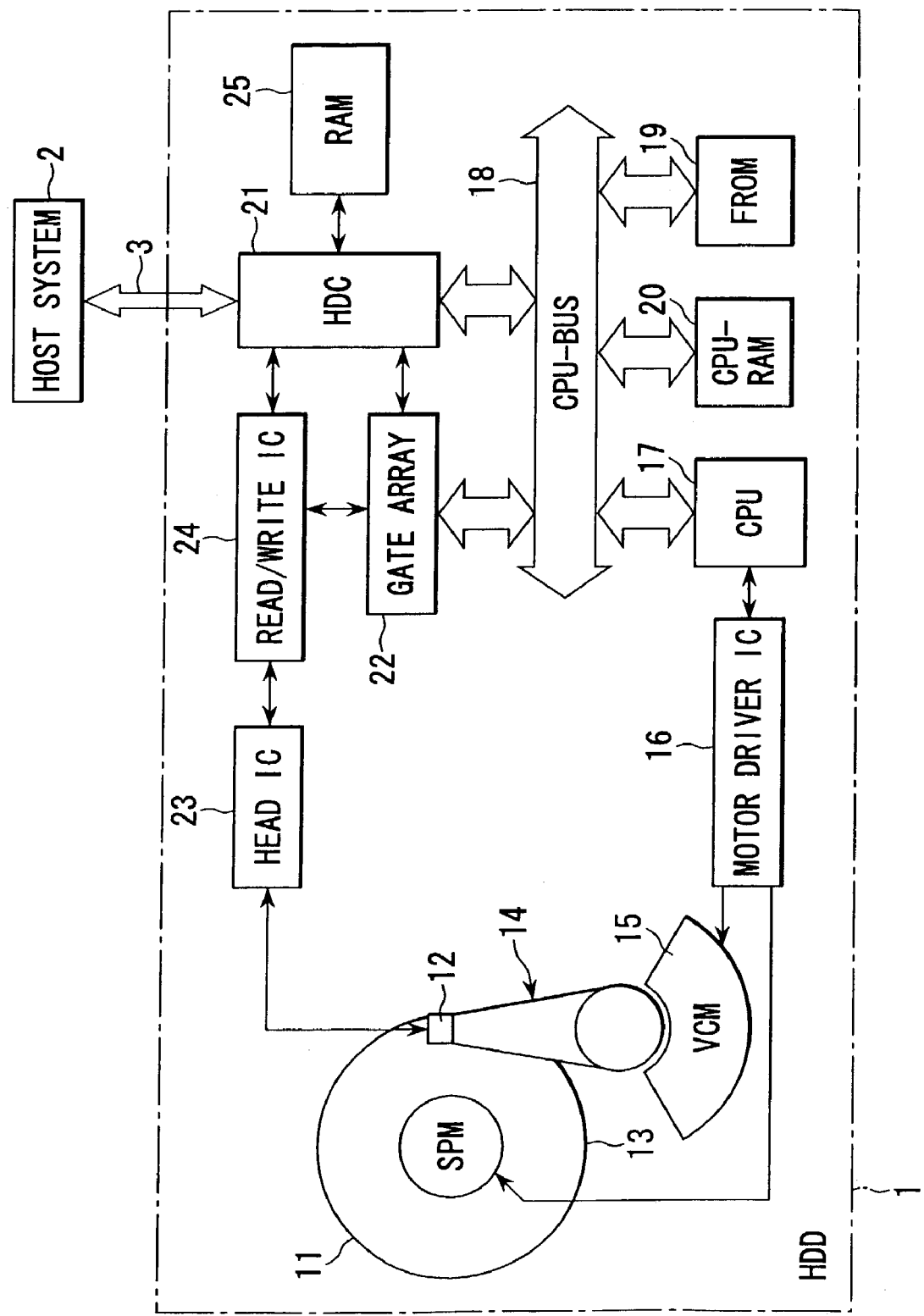
FIG. 1 is a block diagram showing a configuration of a hard disk drive according to an embodiment of the present invention.

Description will be given of an embodiment in which the present invention is applied to a hard disk drive (magnetic disk drive). FIG. 1 is a block diagram showing a configuration of a hard disk drive (hereinafter referred to as an "HDD") according to an embodiment of the present invention. In FIG. 1, a disk (magnetic disk medium) 11 has two disk surfaces: a top surface and a bottom surface. At least one of two disk surfaces of the disk 11, e.g., both disk surfaces constitute recording surfaces on which data is magnetically recorded. Heads (magnetic head) 12 are arranged so as to correspond to the respective recording surfaces of the disk 11. The heads 12 are used to write data in the disk medium 11 (data recording) and read data from the disk medium 11 (data reproduction). In the configuration in FIG. 1, an HDD comprising a single disk 11 is assumed. However, a plurality of disks 11 may be stacked in the HDD.

The disk 11 is rotated at high speed by a spindle motor (hereinafter referred to as an "SPM"). Each of the heads 12 is attached to an actuator (carriage) 14 as a head moving mechanism. The head 12 is moved in the radial direction of the disk 11 as the actuator 14 is rotationally moved. The head 12 is thus positioned on a target track. The actuator 14 has a voice coil motor (hereinafter referred to as a "VCM") 15 acting as a driving source for the actuator 14. The actuator 14 is driven by the VCM 15. The SPM 13 and the VCM 15 are driven by respective driving currents (SPM current and VCM current) supplied by a motor driver IC (Integrated Circuit) 16. The motor driver IC 16 is composed of one chip and drives the SPM 13 and the VCM 15 under the control of a CPU 17. The motor driver IC 16 supplies the SPM 13 with an SPM current the amount of which is specified by the CPU 17 in order to rotate the SPM 13 within a predetermined range of rotation speeds. A state in which the SPM 13 rotates within the predetermined range of speeds is called a "steady rotational state" ("rated rotational state"). The motor driver IC 16 supplies the VCM 15 with a VCM current the amount of which is specified by the CPU 17 in order to position the head 12 at a target position on the disk 11.

The CPU 17 is a main controller for the HDD 1. The CPU 17 executes the control of the elements of the HDD 1 other than the motor driver IC 16 and the control of the motor driver IC in a time division manner. The CPU 17 is connected to a CPU bus (CPU-BUS) 18. A flash ROM (hereinafter referred to as an "FROM") 19, a RAM (hereinafter referred to as a "CPU-RAM") 20, a disk controller (hereinafter referred to as an "HDC") 21, and a gate array 22 are connected to the CPU bus 18. The FROM 19 is a rewritable nonvolatile memory. The FROM 19 stores programs to be executed by the CPU 17. A storage area of the CPU-RAM 20 is used to, for example, store variables used by the CPU 17. The gate array 22 generates signals required to control the HDD 1.

The HDC 21 is connected not only to the CPU bus 18 but also to the gate array 22, a read/write IC 24, and a buffer RAM 25. The HDC 21 is also connected to a host system 2 via a host system interface 3. The host system 2 is electronic equipment utilizing the HDD 1 and is represented by a personal computer. Control registers (HDC register and gate array register) for the HDC 21 and gate array 22, respectively, are assigned to an area in the address space of the CPU 17. The CPU 17 controls the HDC 21 or the gate array 22 by executing a read or a write using this area. The HDC 21 has an interface control function, a disk control function, and a buffer control function. The HDC 21 uses the interface control function to control reception of commands (read/write and other commands) transferred by the host system 2 and the data transfer between the host system 2 and the HDC 21. The HDC 21 uses the disk control function to control the data transfer between the disk 11 and the HDC 21. The HDC 21 uses the buffer control function to control the buffer RAM 25.

The head 12 is connected to the head IC (head amplifier circuit) 23. The head IC 23 has a read amplifier (not shown) that amplifies read signals read by the head 12 and a write amplifier (not shown) that converts write data into a write current. The head IC 23 is connected to the read/write IC (read/write channel). The read/write IC 24 executes various signal processes. These signal processes include an A/D (Analog-to-Digital) converting process for read signals, a process of encoding write data, and a process of decoding read data.

In the HDD 1, when a read command provided by the host system 2 is executed, an area on the disk 11 is accessed which is indicated by a physical address corresponding to a logical address specified by this command. Thus, the head 12 reads a data signal recorded in this area on the disk 11. The head IC 23 then amplifies the signal (read signal) read by the head 12. The read/write IC 24 subjects the amplified signal to A/D conversion and then decodes the converted signal. The HDC 21 processes the data decoded by the read/write IC 24, according to control signals from the gate array 22. Thus, data (read data) to be transferred to the host system is generated. This data is stored in the buffer RAM 25 and then transferred to the host system 2.

On the other hand, when a write command from the host system 2 is executed, data (write data) transferred to the HDC 21 by the host system 2 is stored in the buffer RAM 25. The HDC 21 transfers the write data stored in the buffer RAM 25 to the read/write IC 24 according to control signals from the gate array 22. The write data transferred by the read/write IC 24 is encoded. The encoded write data is transmitted to the head 12 via the head IC 23. Thus, the head 12 writes the write data in an area on the disk 11 indicated by a physical address corresponding to a logical address specified by the above command.

Figure 2:
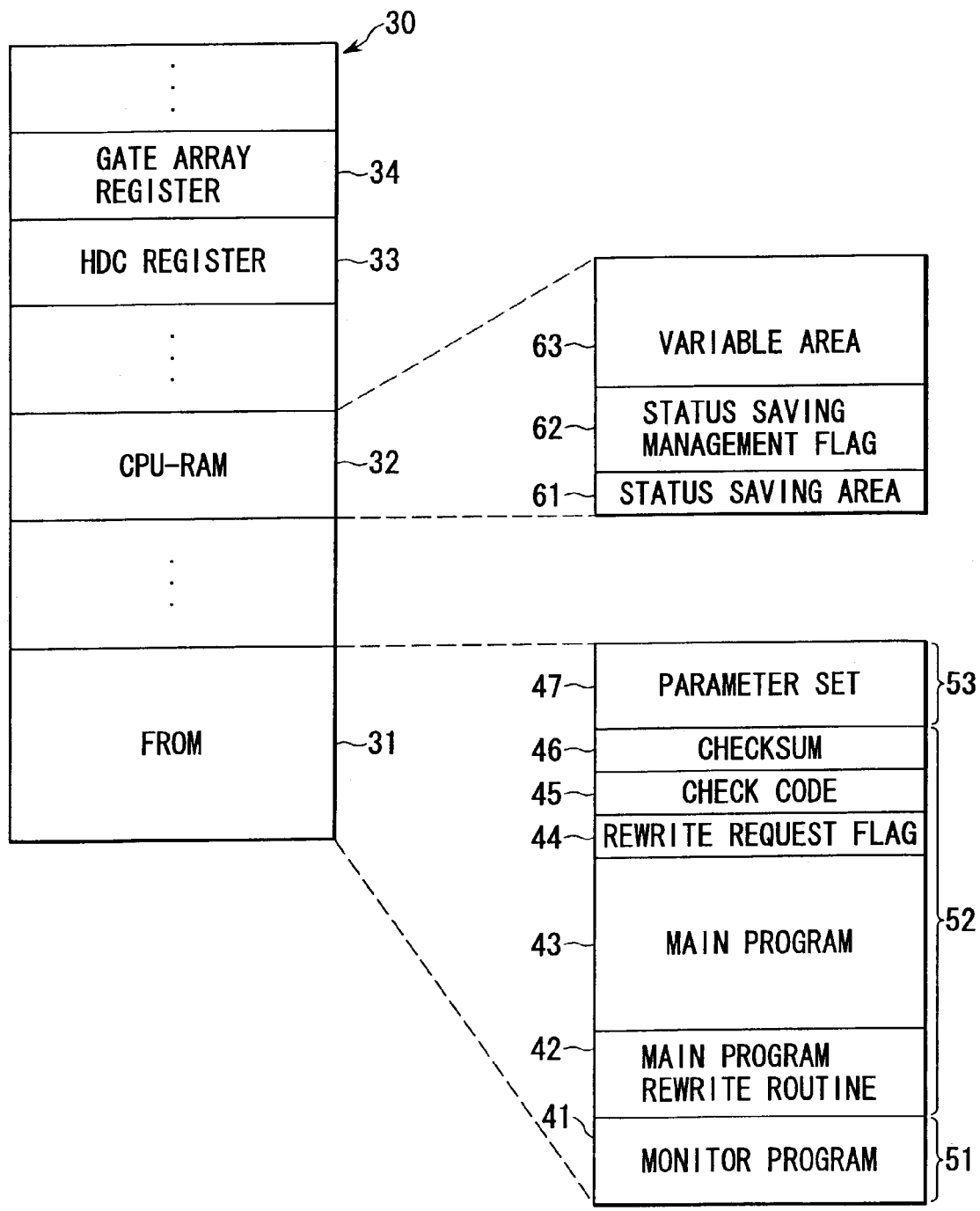
FIG. 2 is a diagram showing an example of map of a CPU address space.

FIG. 2 shows an example of a CPU address space map. The CPU address space map shows the correspondences between various devices connected to the CPU bus 18 and areas in the CPU address space 30 to which these devices are assigned. In the example in FIG. 2, the FROM 19 and the CPU-RAM 20 are assigned to areas 31 and 32 of the CPU address space 30, respectively. Further, the control registers (HDC register and gate array register) for the HDC 21 and gate array 22, respectively, are assigned to areas 33 and 34 of the CPU address space 30, respectively. Thus, the CPU 17 can receive inputs from and transmit outputs to these devices using the same method as that used for memory accesses.

The area 31 of the CPU address space 30, to which the FROM 19 is assigned, is roughly divided into a monitor program area 51, a main program area 52, and a parameter area 53. A monitor program 41 that runs on the CPU 17 is stored in the monitor program area 51. A main program rewrite routine 42 and a main program 43 which run on the CPU 17 are stored in the main program area 52. The main program rewrite routine 42 is used to access the FROM 19. In the present embodiment, the main program rewrite routine 42 accompanies the main program 43. When the main program 43 is rewritten, the main program rewrite routine 42 is also rewritten. However, the main program rewrite routine 42 present before a rewrite is not necessarily different from the main program rewrite routine 42 present after the rewrite. Further, a rewrite request flag 44, check code 45, and checksum 46, described later, are also stored in the main program area 52. A parameter set 47 is stored in the parameter area 53. The parameter set 47 is a set of parameters and includes setting information on predetermined sections of the HDD 1 and various optimization data used by the HDD 1.

The monitor program 41 is provided separately from the main program to implement only the minimum required input and output for the HDD 1. The minimum required input and output correspond to receiving the main program from the host system 2 according to a particular command from the host system 2 for rewriting of the main program and then writing the main program in the main program area 52. The rewriting of the main program according to the monitor program 41 is carried out without utilizing the disk 11 only if the rewriting of the main program according to the main program rewrite routine 42 and the main program 43 is not carried out normally. The HDD 1 (CPU 17) can rewrite the main program as instructed by the host system 2, by using the monitor program 41 even if the main program 43 is not present.

The main program 43 is used to control the entire HDD 1. This control includes the control of accesses to the disk 11. Specifically, the main program 43 is used to control, for example, predetermined hardware components of the HDD 1. The hardware components are, for example, ICs. The ICs include the motor driver IC 16, the head IC 23, and the read/write IC 24. The main program 43 is also used for head positioning control executed to position the head 12 at a target position on the disk 11. The main program 43 is further used to interpret and execute commands transmitted by the host system 2. A function can be added to the HDD1 or an existing function can be improved by rewriting the main program.

The area 32 of the CPU address space 30, to which the CPU-RAM 20 is assigned, is roughly divided into a status saving area 61, an area for a status saving management flag 62, and a variable area 63. The variable area 63 is mainly used to store variables appearing in the monitor program 41 and the main program 43. However, the variable area 63 may be used as a temporary program storage area if the storage contents of the FROM 19 are deleted. This is because if the storage contents of the FROM 19 are deleted, it is impossible to read data from the FROM or write data in the FROM 19.

Figure 3:
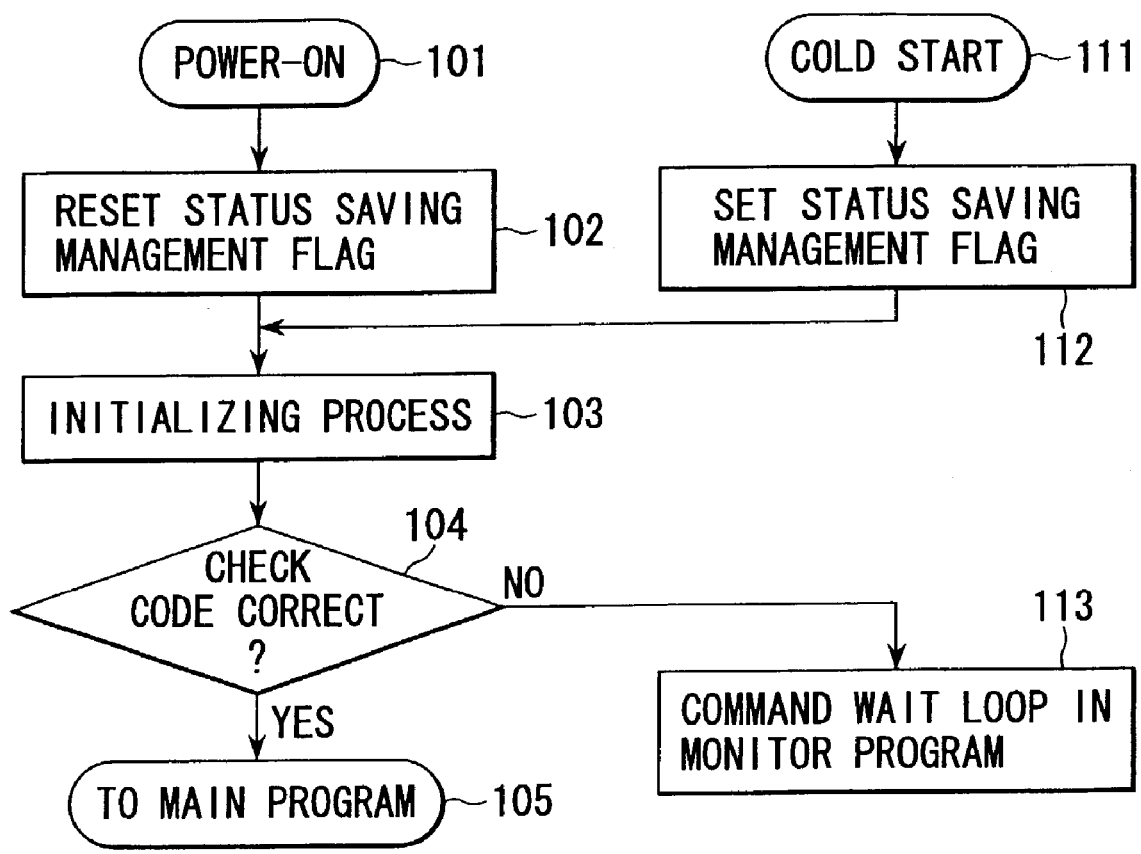
FIG. 3 is a flowchart illustrating a process procedure executed by a monitor program 41 in FIG. 2.
Figure 4A:
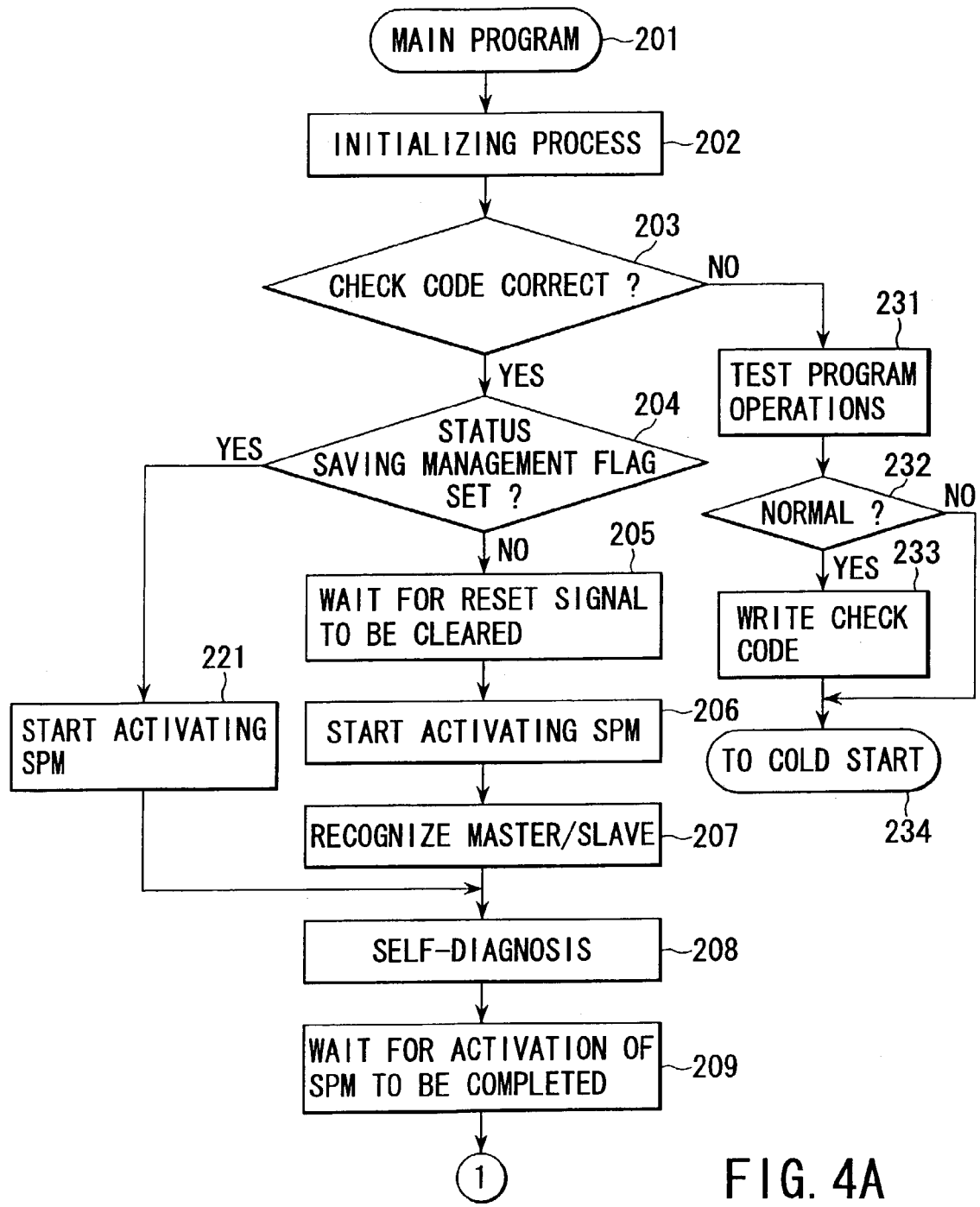
Figure 4B:
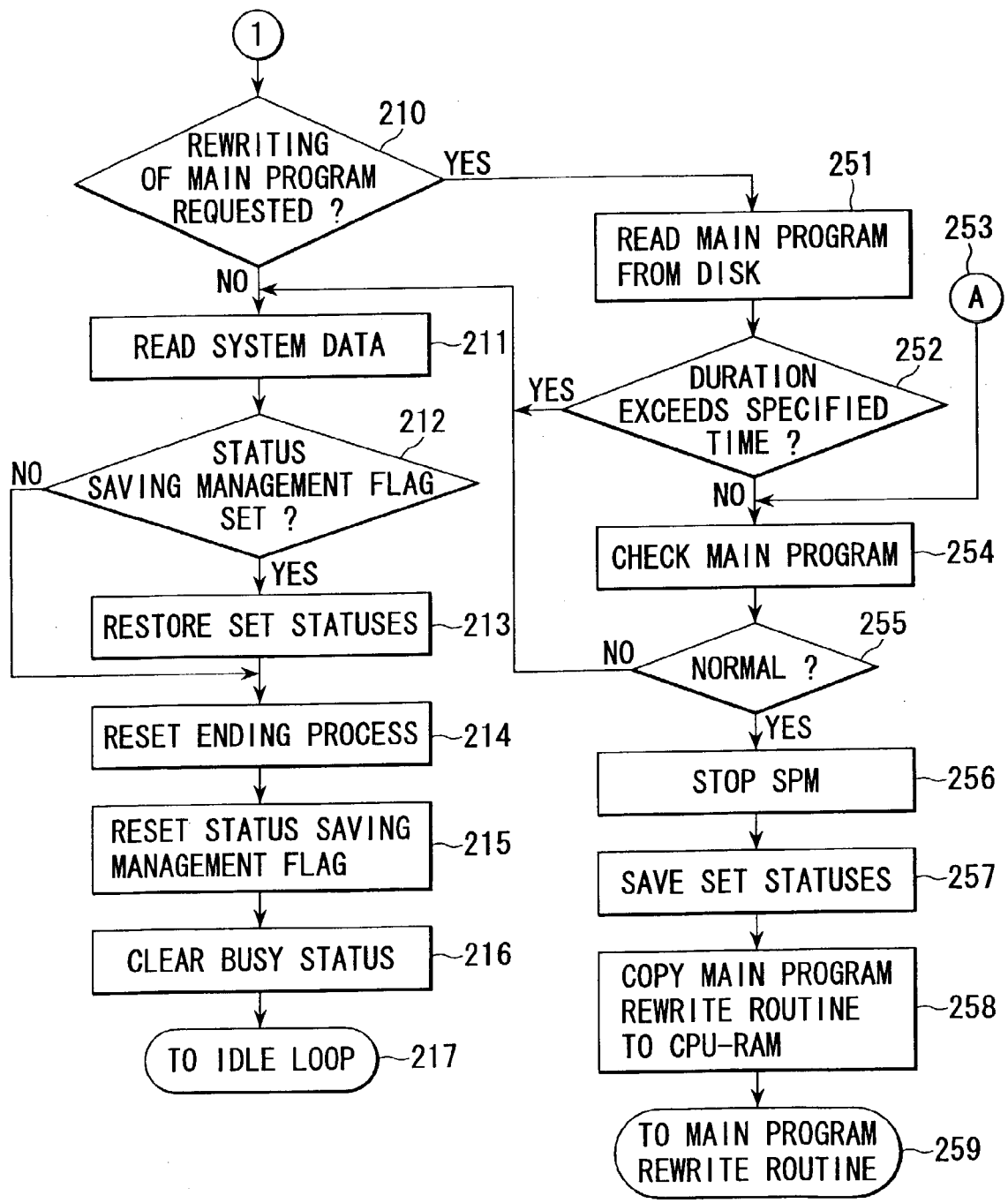

Now, with reference to the flowcharts in FIGS. 3, 4A, and 4B, description will be given of an operation performed by the HDD 1 in FIG. 1 upon power-on (an operation performed upon normal activation). FIG. 3 is a flowchart illustrating a process procedure executed by the monitor program 41. FIGS. 4A and 4B are flowcharts illustrating a process procedure executed by a part of the main program 43 which executes a reset process upon power-on. When the HDD 1 is powered on, the CPU 17 initializes the hardware in the HDD 1 and then starts executing the monitor program 41 at step 101. The CPU 17 first clears (resets) the status saving management flag 62, arranged in the CPU-RAM 20 (step 102). The status saving management flag 62 will be referenced by the main program 43 later. After clearing the status saving management flag 62, the CPU 17 executes the minimum initialization process required to execute the monitor program 41 (step 103). Subsequently, the CPU 17 reads the check code 45, arranged in the main program area 52. According to the check code 45, the CPU 17 determines whether or not the valid main program 43 is present in the main program area 52 (step 104).

As described above, the check code 45 is present in the main program area 52. Accordingly, the check code 45 is deleted at the same time when the main program 43 is deleted for a rewrite. A value for the check code 45 is, for example, 0FFFFH. H at the end of this value indicates that this value is hexadecimal. After the above deletion, the status is changed to the one described below to update the check code 45 to a particular value (for example, 01234H). With this status, a new main program 43 is written in the main program area 52, and it is then confirmed that this main program 43 can be executed correctly.

Thus, at the above step 104, it is determined that the main program 43 is present provided that the check code 45 has the particular value (01234H). In this case, the monitor program 41 branches to the main program 43 (step 105). On the other hand, if the check code 45 has a value different from the particular one, it is determined that the main program 43 is not present. In this case, the CPU 17 enters a command wait loop of the monitor program (step 113) in order to allow the monitor program 41 to execute the minimum required input and output. This command wait loop is different from a command wait loop (idle loop) of the main program 43, described later.

The monitor program 41 includes not only a power-on entry (step 101) but also a particular cold start entry, described later (step 111). The monitor program 41 is configured so that if it is executed using the cold start entry (step 111), control is transferred to step 103 after the status saving management flag 62 has been set in the CPU-RAM 20. In this case, operations similar to those performed upon power-on are performed except for the operation of the status saving management flag 62.

Here, it is assumed that the monitor program 41 branches to the main program 43 (step 105). That is, it is assumed that control is transferred to the main program 43 (step 201). In this case, the CPU 17 executes an initialization process according to the main program 43 (step 202). This initialization process includes the initialization of each section (each IC) of the HDD 1 and of the variable area 63 of the CPU-RAM 20. However, the status saving management flag 62 and status saving area 61 in the CPU-RAM 20 are not initialized.

Further, the CPU 17 does not change the statuses of signal lines (interface signals) in the host system interface 3 which can be recognized by the host system 2 provided that the status saving management flag 62 is set. The host system interface 3 is, for example, an ATA interface. The host system interface 3 contains a BSY (Busy) signal, DASP (Device Active Slave Present) signal, and a RESET signal. Actually, the BSY is not a signal unique to the host system interface 3. That is, the BSY is a particular bit (BSY bit) in a status register which can be read from the HDD 1 via the host system interface 3 by the host system 2. In the present embodiment, for simplification of the description, the status indicated by the BSY bit is treated as the status of a particular interface signal indicative of the BSY in the host system interface 3. The BSY indicates that the device (in this case, the HDD 1) connected to the host system interface 3 cannot receive any commands from the host system 2. The DASP is a signal used by the device connected to the host system interface 3 if it is a slave (slave device), to notify the master (master device) that the device is a slave. This notification can be carried out by activating the DASP signal. The DASP signal also remains active after a command has been received and before the command ends, when the host system 2 accesses the disk. The RESET is a signal used to reset the device (HDD 1) connected to the host system interface 3. The RESET signal (reset signal) is set to be active by the host system 2 when, for example, the host system 2 is powered on.

After finishing the initialization process (step 202), the CPU 17 determines whether or not the check code 45 in the main program area 52 matches the particular value (01234H) (step 203). If the check code 45 does not match the particular value, the CPU 17 determines that the check code 45 has an incorrect value. In other words, the CPU 17 determines that the valid main program 43 is absent from the main program area 52 and that the main program 43 thus has not been completely rewritten. In this case, the CPU 17 transfers the control to step 231. Step 231 constitutes a part of operation of rewriting the main program. In contrast, if the check code 45 matches the particular value, the CPU 17 proceeds to step 204 to check the value for the status saving management flag 62.

If the status saving management flag 62 has not been set, the CPU 17 proceeds to step 205 to perform a normal activating operation. At step 205, the CPU 17 waits for the host system 2 to clear the reset signal (RESET signal) in the host system interface 3. Then, once the reset signal is cleared, the CPU 17 starts an activating operation to activate the SPM 13 (step 206). This activating operation is performed by controlling the motor driver IC 16. In this case, a certain amount of time is required before the SPM 13 reaches the steady rotational state. Thus, after starting the activating operation, the CPU 17 proceeds to the next step 207 without waiting for the steady rotational state to be reached. Consequently, several steps starting with step 207 are executed concurrently with the process of activating the SPM 13.

At step 207, the CPU 17 determines whether each of the devices connected to the host system interface 3 is used as a master or a slave, as described below. One of the devices is the HDD 1. First, if the HDD 1 is used as a slave device, the CPU 17 activates the DASP signal in the host system interface 3 in order to notify the master device of the presence of the HDD 1. In contrast, if the HDD 1 is not used as a slave device, the CPU 17 detects the status of the DASP in the host system interface 3 to check whether or not any slave device is present. Then, the CPU 17 determines whether each of the devices connected to the host system interface 3 is used as a master or a slave.

Now, description will be given of operations performed if it is determined at the above step 204 that the status saving management flag 62 has been set. First, the status saving management flag 62 is not set immediately after power-on. That is, the status saving management flag 62 is set if a reset operation is internally performed again after the status of the HDD 1 has been established. In this case, the status of the HDD 1 includes the master or slave set status and the related statuses of the signal lines in the host system interface 3, and a mode specified by the host system 2. These statuses (set statuses) must be retained. Thus, if the status saving management flag 62 has been set, step 221 or 213 is executed instead of steps 205 to 207, described later. At step 221, an operation is performed to activate the SPM 13 as in the case with the above step 206. This activating operation is started without waiting for clearing the reset signal in the host system interface 3. Further, in the present embodiment, the master or slave set status must be retained. Consequently, the processing corresponding to step 207 is not executed. The statuses of the HDD 1 other than the master or slave set status are restored by re-setting the contents previously saved to the status saving area 61. The statuses of the HDD 1 are restored at step 213.

When the operation of activating the SPM 13 is started at step 221, the CPU executes a self-diagnosis process (step 208). The self-diagnosis process includes checks on the FROM 19, the CPU-RAM 20, and the buffer RAM 25. The process of checking the FROM 19 includes calculation of a checksum for the main program area 52. The checksum 46 corresponding to the data stored in the main program area 52 is stored in the area 52. However, the rewrite request flag 41 and check code 45, contained in the data stored in the main program area 52, are not involved in the calculation of the checksum 46. Further, in checking the CPU-RAM 20, it is necessary to avoid destroying the status saving management flag 62 and the contents of the status saving area 61.

After completing the self-diagnosis process at step 208, the CPU 17 waits for the SPM 13 to reach the steady rotational state (step 209). Once the SPM 13 reaches the steady rotational state, the CPU 17 determines from the status (value) of the rewrite request flag 44 whether or not the rewriting of the main program has been requested (step 210). If the rewrite request flag 44 has an initialized status (0FFFFH), the CPU 17 determines that the rewriting of the main program has not been requested. In this case, the CPU 17 branches to step 211 in order to execute normal activation. In contrast, if the rewrite request flag 44 has a status different from the initialized one, the CPU 17 determines that the rewriting of the main program has been requested. In this case, the CPU 17 executes a main program rewriting process starting with step 251. The main program rewriting process will be described later.

At step 211, the CPU 17 first reads the system data recorded on the disk 11, to execute normal activation. The system data includes a defect sector list and information set by the host system 2. The defect sector list shows a list of defect sectors present on the disk 11. The CPU 17 allows the statuses of the HDD 1 to reflect the system data read from the disk 11. Then, the CPU 17 determines whether or not the status saving management flag 62 has been set in a predetermined area of the CPU-RAM 20 (step 212). If the status saving management flag 62 has been set, the CPU allows the statuses of the HDD 1 to reflect the contents of the status saving area 61 of the CPU-RAM 20 (step 213). That is, the CPU 17 restores the statuses of the HDD 1 according to the read system data and the contents of the status saving area 61. In this case, the contents set at step 211 may be overwritten with the contents of the status saving area 61.

Then, the CPU 17 executes a reset ending process (step 214). The reset ending process sets the status of predetermined signal lines in the host system interface 3 and the control registers for the HDC 21 and gate array 22 to predetermined values. Further, an interruption by the host system 2 is permitted. The reset ending process enables the HDD 1 (HDC 21) to receive a command from the host system interface 3. Thus, the CPU 17 clears the status saving management flag 62 (step 215) and uses the BSY signal in the host system interface 3 to clear the busy status of the HDD 1 (step 216). Then, the CPU 17 enters the idle loop to wait for a command (step 217). The HDD 1 maintains the busy status immediately after power-on and before the busy status is cleared at step 215.

Figure 6:
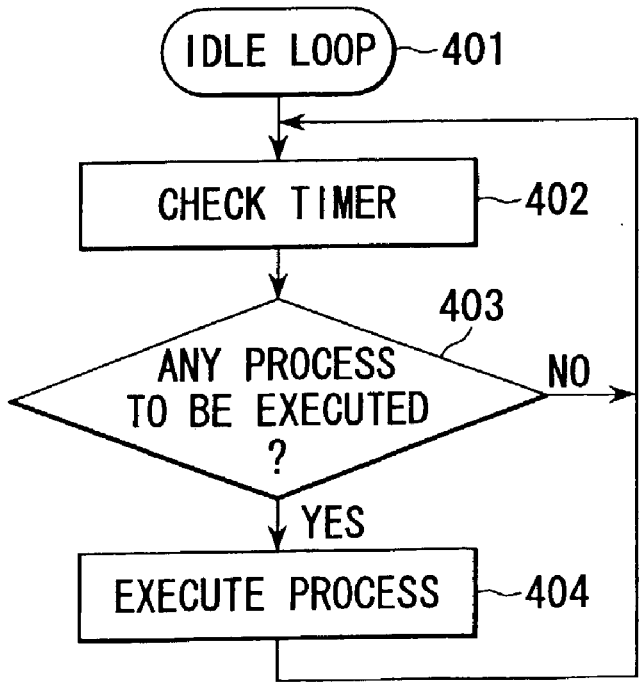
FIG. 6 is a flowchart illustrating a process procedure executed by an idle loop contained in the main program 43 in FIG. 2.
Figure 7:
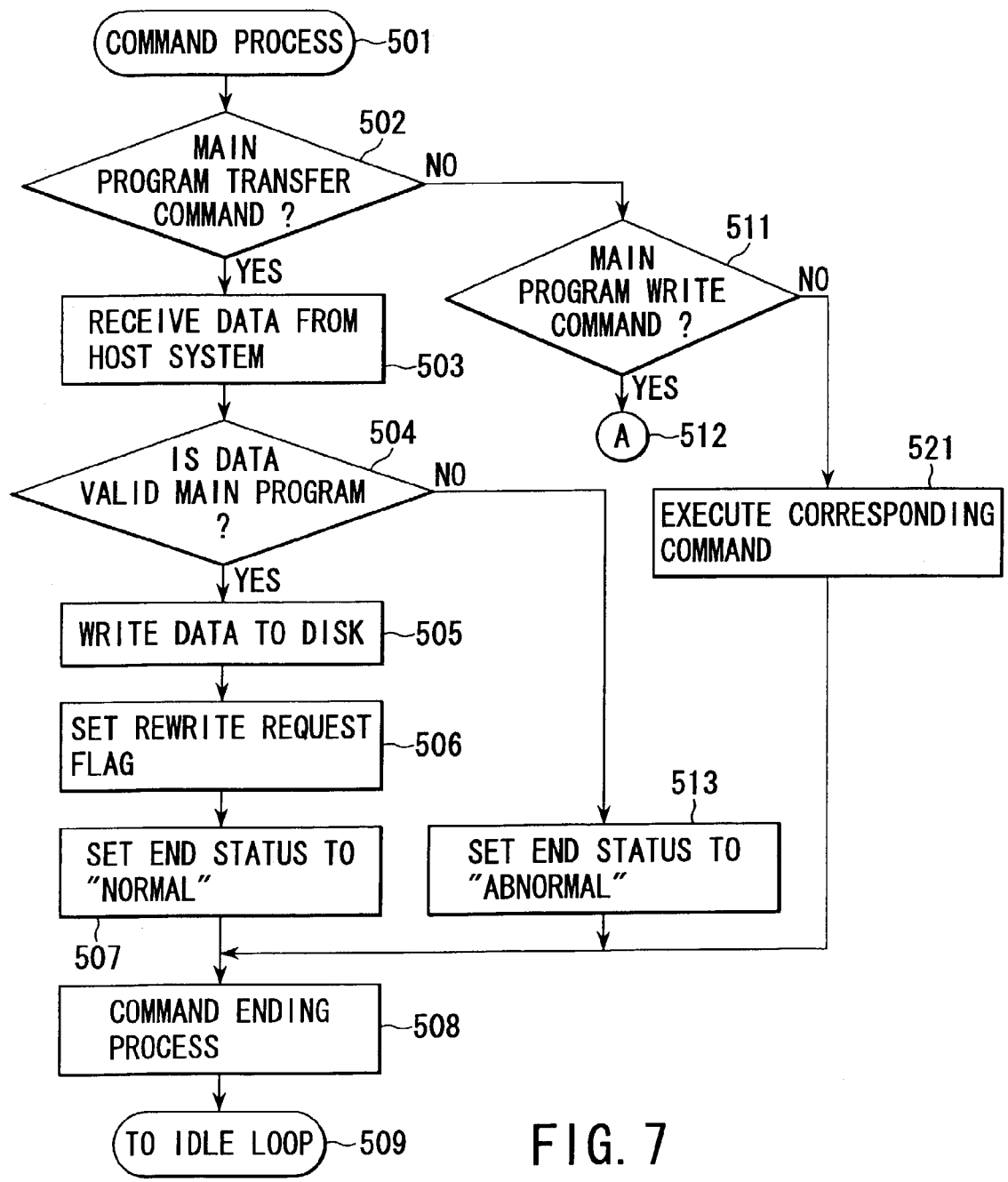
FIG. 7 is a flowchart illustrating a process procedure executed by a command processing routine contained in the main program 43 in FIG. 2.

Now, with reference to the flowcharts in FIGS. 6 and 7, description will be given of a command process executed by the HDD 1 in FIG. 1. FIG. 6 is a flowchart illustrating a process procedure executed by the idle loop (command wait loop) in the main program 43. FIG. 7 is a flowchart illustrating a process procedure executed by a command processing routine in the main program 43. As previously described, once the reset process executed upon power-on according to the main program is completed, the HDD 1 enters the idle loop (step 217). The control is thus transferred to step 401. In the idle loop starting with step 401, the HDD 1 can receive a command from the host system 2. In the idle loop, predetermined processes are executed at respective time intervals before the host system 2 issues a command. In this case, the predetermined processes include a process of saving power to the HDD 1 and the self-diagnosis process.

When the control is transferred to step 401 in the idle loop, the CPU 17 obtains a timer value (step 402). The CPU 17 then determines from the timer value whether or not any process is to be executed in this period (step 403). If any process is to be executed in this period, the CPU 17 executes this process (step 404) and returns to step 402. In contrast, if no processes are to be executed in this period, the CPU 17 executes nothing and transfers the control to step 402. The CPU 17 repeats a process starting with step 402.

The idle loop is used to wait for a command from the host system 2. Thus, even if the idle loop is executing processing, it is necessary to respond to a command from the host system 2. Accordingly, in the present embodiment, the HDC 21, upon receiving a command from the host system 2, requests the CPU 17 to execute an interrupting process. In response to this request, the CPU 17 suspends the process being executed, and immediately sets the HDD 1 to have the busy status. Then, the CPU 17 causes the program to branch from the idle loop to the command processing routine shown in FIG. 7. That is, upon receiving a command from the host system 2 while the idle loop is executing processing, the CPU 17 executes an interrupting process to transfer the control to step 501 in the command processing routine.

During the command processing routine, the CPU 17 receives, from the HDC 21, a command issued by the host system 2 to determine the type of the command (step 502 or 511). If the host system 2 has issued a main program transfer command (step 502), the CPU 17 proceeds to step 503. On the other hand, if the host system 2 has issued a main program write command (step 511), the CPU 17 proceeds to step 512. If the host system has issued a command different from the main program transfer command or the main program write command, the CPU 17 proceeds to step 521 to execute that command. In this case, it is assumed that the CPU 17 proceeds to step 503 or 521 to execute a command different from the main program write command. In this case, after finishing this command, the CPU 17 transfers the control to step 508. At step 508, the CPU 17 executes a command ending process. The command ending process includes setting values for the control registers for the HDC 21 and gate array 22, respectively, and clearing the busy status. After executing the command ending process, the CPU 17 branches to the idle loop again (step 509).

Figure 5:
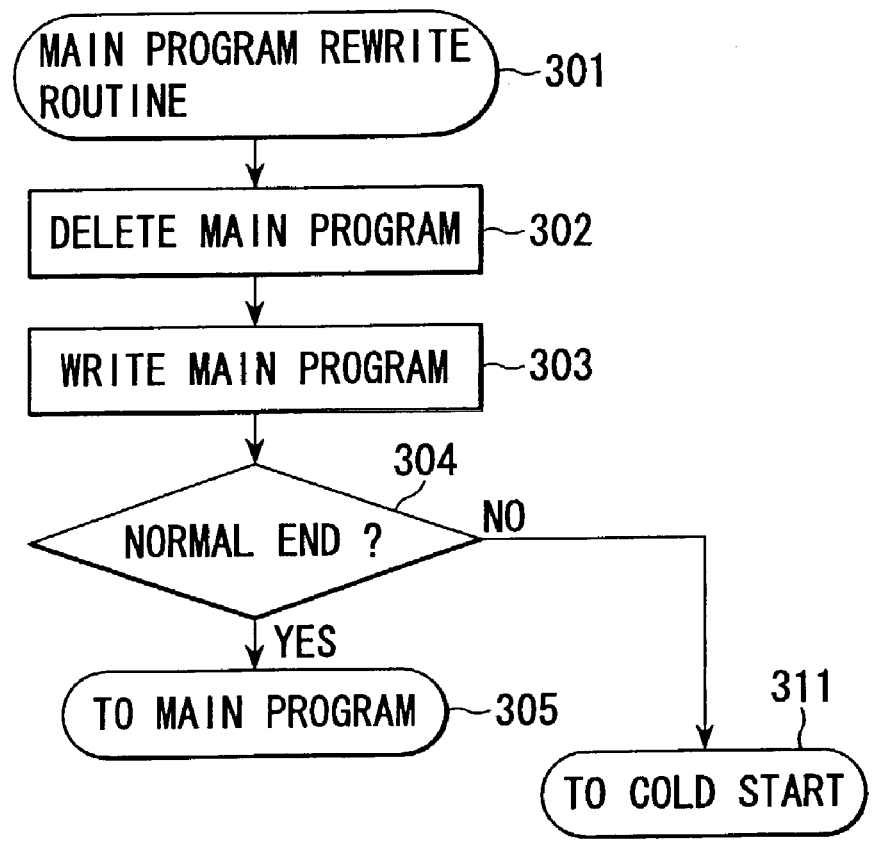
FIG. 5 is a flowchart illustrating a process procedure executed by a main program rewrite routine 42 in FIG. 2.

Now, rewriting of the main program executed upon power-on in the HDD 1 in FIG. 1 will be described with reference to the flowcharts in FIGS. 3, 4A, 4B, 6, and 7 as well as the flowchart in FIG. 5. FIG. 5 is a flowchart showing a process procedure executed by the main program rewrite routine 42, which is copied to the CPU-RAM 20 before use. In the present embodiment, the rewriting of the main program has two main features. A first feature is that a main program transferred by the host system 2 is written to the disk 11 according to the main program transfer command, provided by the host system 2. Writing of the main program to the disk 11 is carried out similarly to a normal data transfer (data write) from the host system. A second feature is that next time the HDD 1 is powered on, the main program written to the disk 11 is read and then written in the main program area 52 of the FROM 19.

It is assumed that the host system issues a main program transfer command to the HDD 1. This main program transfer command is received by the HDC 21 in the HDD 1. Then, the received command starts to be processed as previously described with reference to the flowchart in FIG. 7 (step 501). First, it is determined whether or not the main program transfer command has been received (step 502). If the main program transfer command has been received as in this example, the CPU 17 transfers the control to step 503. At step 503, data (main program) specified by the main program transfer command is received by the HDC 21 and then stored in the buffer RAM 25. Then, the CPU 17 determines, on the basis of, for example, the calculation of the checksum, whether or not the data stored in the buffer RAM 25 is the correct (valid) main program specified by the main program transfer command (step 504). If the data stored in the buffer RAM 25 is not the valid main program, the CPU 17 sets an end status to a value indicative of "abnormality" (step 513). Thus, the CPU 17 aborts the processing of the received command (main program transfer command) (step 508). The CPU 17 then enters the idle loop (step 509).

On the other hand, if the data stored in the buffer RAM 25 is the valid main program, the CPU 17 provides such control as writes the data (main program) to the disk 11 (step 505). Then, the CPU 17 sets the rewrite request flag 44, stored in the main program area 52 of the FROM 19 (step 506). Before the data (main program) stored in the buffer RAM 25 is written in the disk 11, the rewrite request flag 44 was initialized (reset) to, for example, 0FFFFH at step 302. If the rewrite request flag 44 is set at 0FFFFH, this means that the rewriting of the main program has not been requested. The CPU 17 thus writes the main program to the disk 11 and then sets the rewrite request flag 44 to a value other than 0FFFFH at the above step 506. Thus, the rewrite request flag 44 transfers to a status indicating that the rewriting of the main program has been requested. After executing step 506, the CPU 17 sets the end status to indicate "normal" (step 507). The CPU 17 thus ends processing the received command normally (main program transfer command) (step 508). Then, the CPU 17 enters the idle loop (step 509).

It is assumed that during the idle loop, the power supply to the host system 2 (and the HDD 1) is interrupted and subsequently recovered. In this case, the CPU 17 starts an activating operation associated with rewriting of the main program 43 as described below. First, when the HDD 1 is powered on (step 101), the CPU 17 executes steps 102 to 105 and 201 to 209 as in the case with the operation performed during the normal activation accompanying power-on, previously described. Then at step 210, the CPU 17 references the status of the rewrite request flag 44 to determine from this status whether or not the rewriting of the main program has been requested.

In the case of the normal activation, the rewrite request flag 44 has been initialized to 0FFFFH. In this case, it is determined that the rewriting of the main program has not been requested. The control is transferred to step 211. On the other hand, in this example, the rewrite request flag 44 has already been set because the previously described main program transfer command has been executed. If the HDD 1 is powered on in this state, an operation is performed which is different from that performed for the normal activation, as described below. First, at the above step 210, it is determined that the rewriting of the main program has been requested. In this case, the CPU 17 branches to step 251 in order to rewrite the main program 43 currently written in the main program area 52 of the FROM 19. At step 251, the CPU 17 provides such control as reads the main program written to the disk 11 and then stores it in the variable area 63 of the buffer RAM 25. In this case, the variable area 63 is used as a temporary program storage area.

While the main program is being read from the disk 11, a retry process may be executed owing to a read error. In such a case, much time is required to read the main program. Then, the rewriting of the main program 43, stored in the main program area 52, may be delayed to prolong the total activation time. Thus, the present embodiment measures the time (duration) required from the power-on of the HDD 1 until the main program is completely read out. If the measured duration exceeds a predetermined time (specified time), the main program 43 is not rewritten. The CPU 17 thus compares the duration of complete reading of the main program with the specified time (step 252). If the duration of complete reading exceeds the specified time, the CPU 17 transfers the control to step 211. This is because the CPU 17 performs an operation similar to that performed if the rewriting of the main program has not been requested (that is, an operation similar to that performed for the normal activation). Thus, although the rewriting of the main program 43 is delayed at least till the next power-on, the processing time can be prevented from increasing uselessly. It is also possible to use a timer that counts a specified time after power-on (or the start of reading of the main program). The use of this timer enables the control to be transferred to step 211 if the main program is not completely read out even after the timer has counted the specified time.

If the main program is completely read out within the specified time, the CPU 17 determines whether or not the main program read from the disk 11 and then stored in the buffer RAM 25 is normal (steps 254 and 255). This determination can be made utilizing, for example, the calculation of the checksum. If the main program stored in the buffer RAM 25 is normal, the CPU 17 proceeds to step 256. In contrast, if the main program stored in the buffer RAM 25 is abnormal, the CPU 17 transfers the control to step 211 in order to subsequently perform an operation similar to that performed for the normal activation.

If the CPU has proceeded to step 256, it controls the motor driver IC 16 to stop driving the SPM 13 in order to rewrite the main program 43. The driving of the SPM 13 is stopped because when the main program 43 is rewritten, a routine for controlling the SPM 13 and the VCM 15 is also deleted to preclude the SPM 13 and the VCM 15 from being controlled. Even when the CPU 17 causes the driving the SPM 13 to be stopped, the SPM 13 continues rotating because of inertia. Much time is thus required before the rotational speed of the SPM 13 reaches a predetermined value. Thus, immediately after causing the driving of the SPM 13 to be stopped at step 256, the CPU 17 transfers the control to step 257 without waiting for the rotational speed of the SPM 13 to reach the predetermined value. At step 257, the CPU 17 obtains the currently set statuses (set statuses) of the HDD 1. The CPU 17 then saves information (status information) indicative of the set statuses obtained to the status saving area 61, provided in the CPU-RAM 20. The processing at step 257 is executed to restore the current set statuses after the control has been transferred to a new program 43 as a result of the changing of the main program 43 stored in the FROM 19 to this new program.

Then, the CPU 17 copies the main program rewrite routine 42, saved to the main program area 52 of the FROM 19, to the variable area 63 of the CPU-RAM 20 (step 258). The reason why this process is executed will be described below. First, to rewrite the main program 43, the main program rewrite routine 42, which executes the rewriting, is required. However, while the main program 43 is being rewritten, the entire FROM 19 is inaccessible. In this case, the main program rewrite routine 42 cannot be run on the FROM 19. Thus, in the present embodiment, an arrangement is applied in which in place of the FROM 19, the main program rewrite routine 42 is run on the CPU-RAM 20. Thus, at the above step 258, the main program rewrite routine 42 is copied from the main program area 52 of the FROM 19 to the variable area 63 of the CPU-RAM 20. The main program rewrite routine 42 is configured to run on the variable area 63 of the CPU-RAM 20 to complete a main program rewriting process and then branch to the start of the main program 43.

After completely copying the main program rewrite routine 42 to the CPU-RAM 20 (step 258), the CPU 17 branches to a particular address in the variable area 63 of the CPU-RAM 20. The CPU 17 thus causes the main program rewrite routine 42 being copied to the variable area 63 of the CPU-RAM 20 to run on the CPU-RAM 20 (step 259). The CPU 17 rewrites the main program 43 according to the main program rewrite routine 42 as described below.

The FROM 19 is characterized in that while data is being written in the FROM 19, new data cannot be additionally written in the area in which the first data is being written. That is, the data in this area must be deleted before new data can be written in this area. Thus, after transferring the control to the main program rewrite routine 42, the CPU 17 deletes all data on the main program area 52 of the FROM 19 (step 302). This deletes not only the main program 43 but also the main program rewrite routine 42, the rewrite request flag 44, the check code 45, and the checksum 46. Then, the CPU 17 sequentially writes the main program stored in the buffer RAM 25 in the main program area 52 of the FROM 19 (step 303). The program thus stored is the new main program 43. At this time, the main program rewrite routine accompanying the main program is also written in the main program area 52 as the main program rewrite routine 42.

It is assumed that the new main program 43 has been completely written normally (step 304). In this case, the CPU 17 branches the main program rewrite routine 42 to the start (step 201) of the main program 43 (step 305). On the other hand, if the new main program 43 has not been written normally (step 304), the CPU 17 determines that the new main program 43 is invalid. In this case, the CPU 17 branches the main program rewrite routine 42 to a particular cold start entry (step 311).

Once the new main program 43 is completely written normally and then the control is transferred to the new main program 43 (step 201), an initializing process is executed as in the case with the previously described branching of the monitor program 41 to the main program 43 (step 202). This allows the initialization of each section (each IC) of the HDD 1 and of the variable area 63 of the CPU-RAM 20. Then, the CPU 17 examines the check code 45 in the main program area 52 (sep 203). In this stage, the check code 45 has not been written yet. That is, the check code 45 is still in its initialized state. In this case, the CPU 17 branches to step 231.

As described above, in the present embodiment, while the main program 43 is being rewritten, the reset process portion shown in the flowcharts in FIGS. 4A and 4B is executed a number of times using different paths. Thus, the program structure of the reset process portion, notably the branching conditions are preferably common to the new main program 43.

After branching to step 231, the CPU 17 tests operations of the new main program 43. The executed tests include a self-diagnosis process similar to that executed at the previously described step 208. The tests also include a process of causing a command interruption to be falsely issued to check whether or not a routine for executing a command operates correctly. The CPU 17 determines from the results of the tests at step 231 whether the new main program 43 operates normally (step 232). If the new main program 43 operates normally, the CPU 17 determines that the main program 43 has been written correctly. In this case, the CPU 17 writes the check code 45 of the particular value (01234H) in the main program 52 (step 233). Once step 233 has been executed, the operation of writing the new main program 43 is completed normally. Then, to check whether or not the operation of writing the new main program 43 is completed normally, the CPU 17 executes the monitor program 41 from its head (step 234). However, the monitor program 41 does not branch to the power-on entry (step 101) but to the above described cold start entry (step 111). This is because the statuses of the signal lines in the host system interface 3 cannot be changed while the main program is being rewritten and because the set statuses of the HDD 1 saved at the above step 257 must be restored according to the new main program 43.

After branching to the cold start entry (step 111), the CPU 17 first sets the status saving management flag 62, arranged in the CPU-RAM 20 (step 112). Then, the CPU 17 executes an initializing process (step 103) as in the case with the previously described operation performed upon power-on (step 101). This operation differs from that performed upon (immediately after) power-on in that the initializing process (step 103) is not executed after the status saving management flag 62 has been reset (step 102) but after the status saving management flag 62 has been set (step 112).

After executing the initializing process (step 103), the CPU 17 determines whether or not the correct check code 45 has been written in the main program area 52 (step 104). At this point of time, the check code 45 of the correct value (01234H) written at the previous step 233 is in the main program area 52. In this case, the CPU 17 branches to step 105 to execute the new main program 43 again from its head (step 201). Then, after executing an initializing process (step 202), the CPU 17 determines whether or not the correct check code 45 has been written in the main program area 52 as in the case with the above step 104 (step 203). Also as with the above step 104, it is determined that the check code 45 of the correct value (01234H) has been written in the main program area 52. In this case, the CPU 17 branches to step 204 to determine whether or not the status saving management flag 62 has been set.

Step 204 is executed during the main program 43 branching from the monitor program 41. In this case, the monitor program 41 starts with the cold start entry (step 111). At step 112, following the cold start entry (step 111), the status saving management flag 62 is set. Accordingly, it is determined at step 204 that the status saving management flag 62 has been set. If the status saving management flag 62 has been set, the CPU 17 branches to step 221 so as to prevent changes in the master or slave set status and in the statuses of the signal lines in the host system interface 3 as previously described. At step 221, the CPU 17 carries out only the activation of the SPM 13. Subsequently, the CPU 17 executes a self-diagnosis process (step 208) as in the case with the normal activation. Then, once the SPM 13 reaches the steady rotational state (step 209), the CPU 17 determines from the value for the rewrite request flag 44 whether or not the rewriting of the main program has been requested (step 210). In this case, the deleting operation performed at step 302 has cleared the rewrite request flag 44. The CPU 17 thus determines that the rewriting of the main program has not been requested. Then, the CPU 17 reads the system data recorded on the disk 11 and allows the statuses of the HDD 1 to reflect this data (step 211) as in the case with the normal activation.

Then, the CPU 17 determines whether or not the status saving management flag 62 has been set (step 212). In this case, the status saving management flag 62 has been set. The CPU 17 thus reads the status information saved to the status saving management area 61 (step 257) before the main program is rewritten. It then allows the current statuses of the HDD 1 to reflect the set statuses of the HDD 1 indicated by the status information (step 213). That is, the CPU 17 restores the statuses of the HDD 1 to those present before the main program is rewritten. During this restoring process, the contents set at step 211 may be changed to the contents restored at step 213. Subsequently, the CPU 17 executes steps 214 to 216 as in the case with the normal activation to allow a command to be received from the host system 2. The CPU 17 then branches to the idle loop (step 217) to complete the activating process after power-on, including the rewriting of the main program 43.

In the present embodiment, the HDD1 maintains the busy status after power-on and before step 216 in the new main program 43 is executed to clear the busy status, as well as while the main program is being rewritten and reactivated. Thus, the host system 2 simply recognizes that the time required to activate the HDD 1 upon power-on has increased. Furthermore, in the present embodiment, the master or slave set status, set by the processing at step 207 according to the unchanged main program 43, and the other set statuses of the HDD 1 are restored to the statuses present before the rewrite. That is, in the present embodiment, the master or slave set status and the other set statuses of the HDD 1 are similar to those present during the normal activation. Thus, in the present embodiment, the main program 43 can be rewritten without affecting the operation of the host system 2.

As described above, in the present embodiment, the rewriting of the main program is carried out as a part of the activating process performed upon power-on. Further, in the present embodiment, the main program can also be rewritten by causing the host system 2 to issue a particular command (main program write command) to the HDD 1 after the main program transfer command.

With reference to FIGS. 4B, 5, and 7, description will be given below of the rewriting of the main program according to the main program write command. First, it is assumed that the host system 2 has issued a main program transfer command to the HDD 1. In this case, the main program transfer command, in the command processing routine, is executed to write to the disk 11 the new main program transferred by the host system 2. It is further assumed that after the main program transfer command, the host system 2 issues a main program write command, which is then received by the HDC 21. In this case, the CPU 17 determines that the HDC 21 has received the main program write command, in the command processing routine in FIG. 8 (step 511). The CPU 17 then branches to step 253 (entry A) contained in the reset process portion of the main program 43. After branching to step 253, the CPU 17 rewrite the main program 43 stored in the main program area 52 as in the case with the rewriting of the main program carried out upon power-on (steps 254 to 259 and 301 to 305). Then, once the main program 43 is completely rewritten, the busy status is cleared to allow a command to be received.

In this manner, even if the main program is rewritten according to the main program write command, the host system 2 simply recognizes that it has executed the single main program write command. Also in this case, after the main program 43 has been rewritten, the set statuses of the HDD 1 are restored to those present before the rewriting. Thus, the main program 43 can be rewritten without affecting the subsequent operations of the host system 2. In the above described embodiment, the main program transfer command and the main program write command are provided separately. However, a single command (main program transfer command) can continuously transfer and rewrite the main program. To achieve this, for example, the CPU 17 may branch to the entry A (step 253) rather than executing the command ending process (step 508) in the main program transfer command processing routine.

In this manner, in the present embodiment, if the HDD 1 receives a program transfer command issued by the host system 2, the program (new program) specified by this command is written in the HDD 1. In this case, the processing for the program transfer command ends without rewriting the main program 43 stored in the FROM 19. The main program 43 is rewritten using the new program already written to the disk 11 next time the HDD 1 is powered on. The rewriting of the main program 43 is automatically carried out as a part of the activating process executed when the HDD 1 is powered on. This enables the main program 43 stored in the FROM 19 of the HDD 1 to be rewritten regardless of the architecture of the host system 2. Further, to rewrite the main program 43, the host system 2 has only to execute a program transfer command. Consequently, no complicated procedures are required. The present embodiment can thus flexibly rewrite the program according to an instruction from the host system 2 having any of various architectures.

In the above described embodiment, the present invention is applied to a hard disk drive (HDD). However, the present invention is also applicable to disk drives in general such as magneto-optical disk drives which use a disk medium as a recording medium and which use a head to write data in the disk medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of rewriting a program stored in a nonvolatile memory in a disk drive in which control including that of accesses to a disk medium is executed in accordance with the program, the method comprising:

writing a program specified by a program transfer command for transfer of a program, to the disk medium upon receiving the program transfer command from a host system; and executing an activating process to activate the disk drive in accordance with the program stored in the nonvolatile memory when the disk drive is powered on wherein the executing an activating process includes;

rewriting the program stored in the nonvolatile memory using the program written to the disk medium according to the program transfer command; and comparing a duration of complete reading of the program written to the disk medium in accordance with the program transfer command, with a predetermined time, wherein the rewriting of the program is hindered if the duration exceeds the predetermined time, and in the executing an activating process, the activating process is continued by assuming that a program used to rewrite the program has not been written to the disk medium.

2. A method of rewriting a program stored in a nonvolatile memory in a disk drive in which control including that of accesses to a disk medium is executed in accordance with the program, the method comprising:

writing a program specified by a program transfer command for transfer of a program, to the disk medium upon receiving the program transfer command from a host system;

executing an activating process to activate the disk drive in accordance with the program stored in the nonvolatile memory when the disk drive is powered on, wherein the executing an activating process includes:

rewriting the program stored in the nonvolatile memory using the program written to the disk medium according to the program transfer command;

switching to execution of a new program obtained after the rewriting;

confirming that the new program obtained after the rewriting operates normally; and if it is confirmed that the new program obtained after the rewriting operates normally, writing particular information to the nonvolatile memory, the information indicating that the new program is normal, determining whether the particular information has been written to the nonvolatile memory, in accordance wit a monitor program independent of the program to be rewritten; and if it is determined that the particular information has nor been written to the nonvolatile memory, continuing execution of the monitor program instead of execution of the new program obtained after the rewriting, wherein if the particular information is written to the nonvolatile memory, the activating process is continued in accordance with the new program obtained after the rewriting.

3. The method according to claim 2, wherein the monitor program includes a command wait loop to wait for a command from the host system if it is determined that the particular information has not been written to the nonvolatile memory.

4. The method according to claim 3, wherein the monitor program includes a processing routine operating if a particular command to rewrite a program is received during the command wait loop, to rewrite the program stored in the nonvolatile memory using a program specified by the particular command.

5. A method of rewriting a program stored in a nonvolatile memory in a disk drive in which control including that of accesses to a disk medium is executed in accordance with the program, the method comprising:

writing a program specified by a program transfer command for transfer of a program to the disk medium upon receiving the program transfer command from a host system; and executing an activating process to activate the disk drive in accordance with the program stored in the nonvolatile memory when the disk drive is powered on, wherein the executing an activating process includes:

rewriting the program stored in the nonvolatile memory using the program written to the disk medium according to the program transfer command; saving status information indicative of a status of the disk drive at that point of time, before the program is rewritten;

after the program has been rewritten, executing an initializing process while a host system interface maintains the same status as that present before the program is rewritten, the host system interface connecting the host system and the disk drive together, the status of the host system interface containing a busy status set when the disk drive is powered on; and after the program has been rewritten, restoring a status of the disk drive in accordance with the status information saved before the program is rewritten.

6. The method according to claim 5, wherein the executing an activating process includes clearing the busy status after the status of the disk drive has been restored.

* * * * *